Feb. 5, 1963   D. R. WEDAN   3,076,494
CONTROL VALVE FOR CUTTING TORCH
Filed March 28, 1960   2 Sheets-Sheet 2
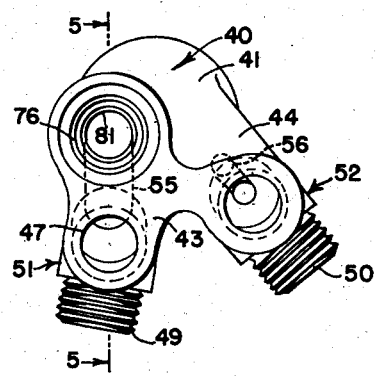
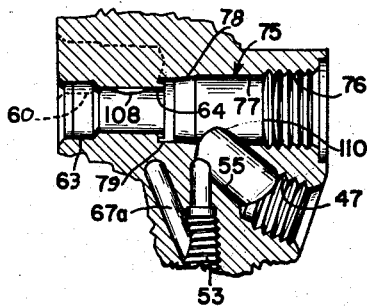
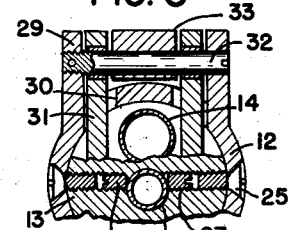
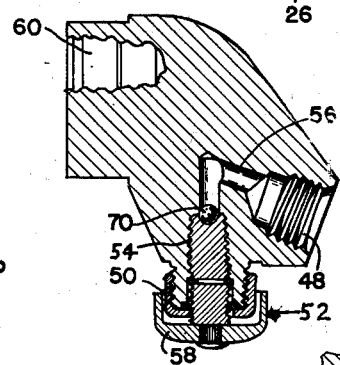
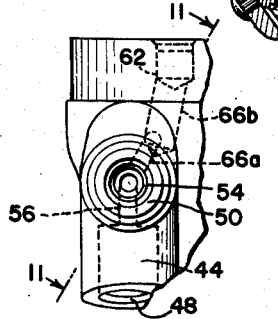
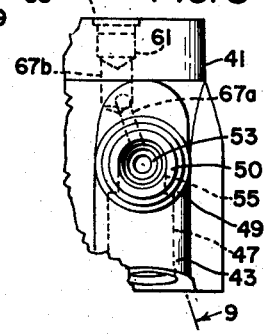
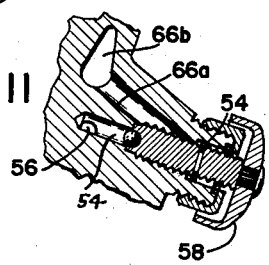
*INVENTOR.*
DONALD R. WEDAN
BY
ATTORNEYS

United States Patent Office 3,076,494
Patented Feb. 5, 1963

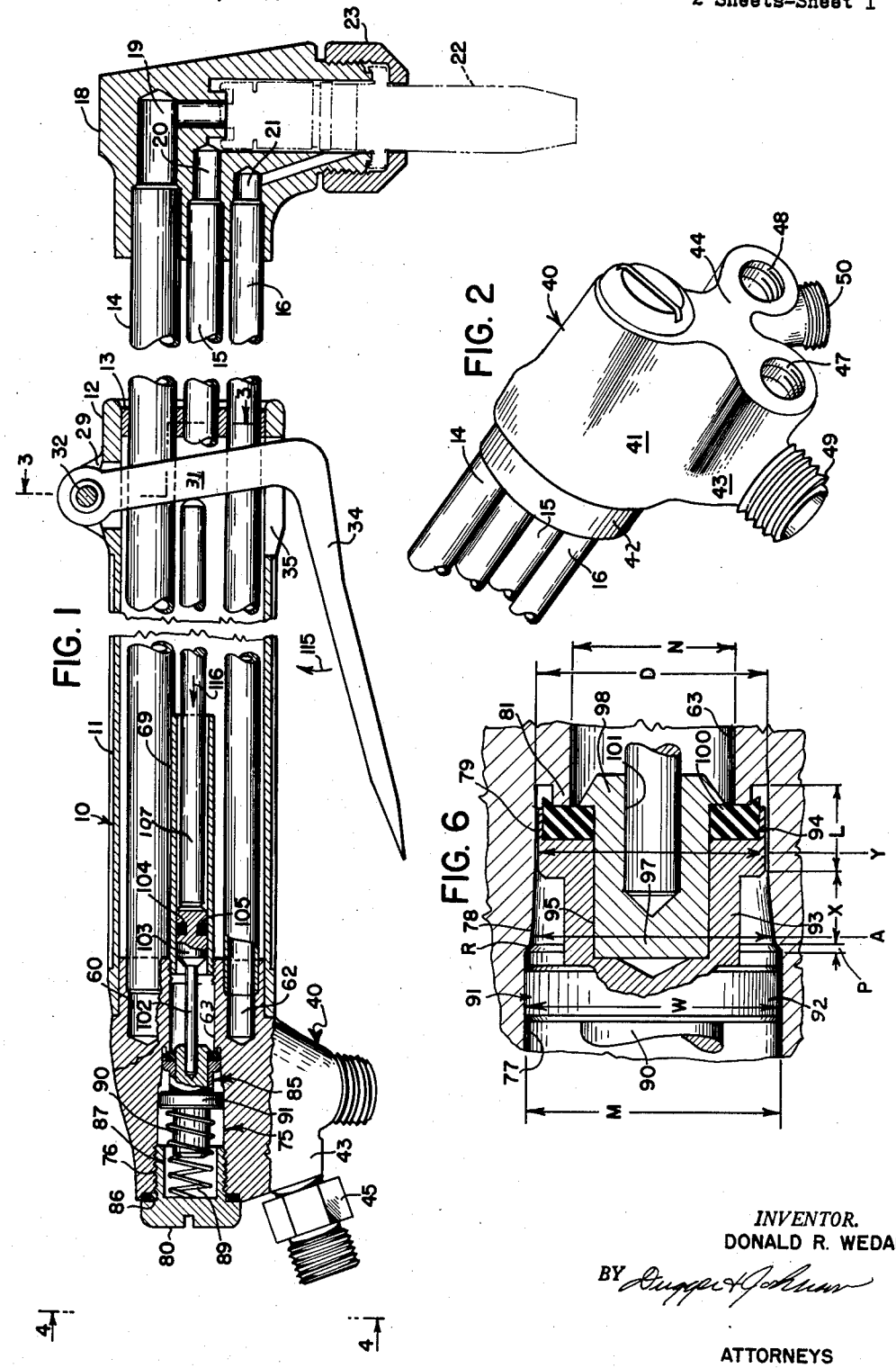

3,076,494
CONTROL VALVE FOR CUTTING TORCH
Donald R. Wedan, Golden Valley, Minn., assignor to Tescom Corporation, a corporation of Minnesota
Filed Mar. 28, 1960, Ser. No. 17,970
3 Claims. (Cl. 158—27.4)

This invention relates to new and novel improvements in a fluid control for a cutting torch. More particularly this invention relates to new and novel improvements in a control valve for an oxy-acetylene or an oxy-fuel gas cutting torch.

It is an object of this invention to provide a new and improved high pressure oxygen control valve for a cutting torch. It is another object of this invention to provide a new and improved fluid control valve for a high pressure cutting torch that minimizes the tendency to "kick back" at the start of the cut.

A further object of this invention is to provide a control valve for a cutting torch that more readily gives a relatively gradual constant increase of the flow of cutting oxygen from zero to the full required flow than possible with cutting torches of the prior art. It is still another object of this invention to provide high pressure oxygen control valve in a cutting torch butt having a valve seat retainer and valve bore contoured to give a relatively low gas flow for starting the cut and followed without interruption by full gas flow in the volume required for the metal being cut.

Other and further objects are those inherent in the invention herein illustrated, described in the claims, and will be appearing as the description proceeds.

To the accomplishment of the aforegoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In certain oxygen cutting applications, particularly in piercing a hole in a piece of metal, it is desirable to control the flow of cutting oxygen so that it increases relatively gradually from zero to the full required flow to provide an "ease-on" feature in contrast to starting a cut with a cutting torch having a conventional high pressure cutting oxygen valve. With a conventional high pressure oxygen valve it is difficult to exercise control over the high pressure oxygen flow, since the valve is usually closed or wide open.

With conventional torches in which the cutting oxygen valve moves from a fully closed to a fully opened position almost instantaneously, the molten slag is usually blown upward quite violently and it has a tendency to spread fanlike to a degree that is undesirable and in some instances, unsafe. With the "ease-on" valve of this invention which permits the cutting oxygen flow rate to be increased more gradually, the chemical reaction between the hot steel and the oxygen jet can be controlled so that the "flying slag" is greatly reduced when the pierce is being started.

Also with a conventional torch the opening of the cutting oxygen valve causes the torch head to "kick back," not so violently, but much like a shotgun when fired. The kick back phenomenon is particularly noticeable and objectionable when piercing thick material where a high flow rate of gas is required. Unless the operator reacts quickly, this "kick back" can have an adverse effect upon the start of the pierce. In order to overcome problems, such as those above mentioned, the control valve of this invention has been made.

The invention is illustrated by reference to the drawings in which corresponding numerals referred to the same parts, and, in which:

FIGURE 1 is a fragmentary vertical sectional view of a cutting torch assembly, said view illustrating the control valve and valve operating mechanism of this invention;

FIGURE 2 is a fragmentary perspective view of the butt of the torch illustrated in FIGURE 1, the handle tube not being shown in order to better illustrate the relative positions of the push rod and the various fluid conduits of the torch;

FIGURE 3 is a vertical cross sectional view generally taken along the line and looking in the direction of the arrows 3—3 of FIGURE 1 to illustrate the mounting of the hand lever;

FIGURE 4 is a vertical back end view of the torch butt having the control valve of this invention, the back cap for retaining the valve seat retainer in position not being illustrated;

FIGURE 5 is a fragmentary vertical sectional view generally taken along the line and looking in the direction of the arrows 5—5 of FIGURE 4 to illustrate the contour of the cutting oxygen valve bore and most of the oxygen passageways formed in the control valve, the structure for controlling the flow of oxygen through the valve not being illustrated;

FIGURE 6 is an enlarged fragmentary vertical sectional view of a portion of the valve bore illustrated in FIGURE 5 to more clearly illustrate the contour thereof and the mounting of the valve seat subassembly therein, the annular clearance between the seat retainer and the valve bore being exaggerated to facilitate illustrating said clearance.

FIGURE 7 is a front end view of the torch butt having a control valve of this invention;

FIGURE 8 is an inclined bottom view of the oxygen bifurcated portion of the torch butt, said view being generally taken along the line and looking in the direction of the arrows 8—8 of FIGURE 7;

FIGURE 9 is a fragmentary, generally vertical, sectional view taken along the line and looking in the direction of the arrows 9—9 of FIGURE 8 to partially illustrate the oxygen flow path to the preheat oxygen outlet port and to show the oxygen needle valve subassembly;

FIGURE 10 is an inclined bottom view of the fuel gas bifurcated portion of the torch butt, said view being taken along the line and looking in the direction of the arrows 10—10 of FIGURE 7;

FIGURE 11 is a fragmentary, generally vertical sectional view taken along the line and looking in the direction of the arrows 11—11 of FIGURE 10 to, in part, illustrate the fuel gas flow path from the fuel gas needle valve to the fuel gas outlet port;

FIGURE 12 is a generally vertical sectional view illustrating the fuel gas needle valve sub-assembly, said view being taken along the line and looking in the direction of arrows 12—12 of FIGURE 7.

Referring now in particular to FIGURE 1 there is illustrated a rugged duty cutting torch generally designated 10. The cutting torch includes a handle tube 11 having an enlarged diameter front portion 12. Mounted in the front portion of the handle tube is a front plate 13 having three vertically spaced apertures formed therein for retaining the fluid conduits 14–16 inclusive in proper spaced relation. The cutting oxygen conduit 14 passes through the top aperture, the preheat oxygen conduit 15 passes through the central aperture and the fuel gas conduit 16 passes through the bottom aperture. The aforementioned conduits 14, 15 and 16 extend forwardly from the front plate and have their front ends secured in spaced bores formed in a conventional torch head 18 in fluid communication with appropriate fluid channels formed in the torch tip 22 by passages 19, 20 and 21 respectively. The torch tip is retained in the torch head by a head nut 23. The torch head and torch tip may be of a design such as illustrated in U.S. Patent 2,702,079, issued February 15, 1955, or U.S. Patent 2,672,187, issued March 16, 1954. Since the torch tip illustrated in FIGURE 1 is of conventional design, it will not be further described.

The front plate 13 is retained in the handle tube by a pair of oval headed screws 25 mounted in diametrically opposed apertures formed in the enlarged portion of the handle tube and extended into threaded apertures 27 formed on opposite diametric sides of the front plate (see FIGURE 3). Mounted in each of the apertures 27 is an oval headed screw 25 and an Allen head screw 26 having an inner end that bears against the conduit 15 to hold the front plate in position.

A pair of transversely spaced upwardly projecting ears 29 are formed on the enlarged tube portion 12, there being a slot 30 adjacent each ear and intermediate the ears. One arm 31 of the bifurcated hand lever 34 extends upwardly through each slot and is rotatably mounted on a lever pin 32 that is mounted in apertures formed in the ears 29. A spacer 33 is mounted on the pin intermediate the arms to retain said arms in proper spaced relation. The arms extend downwardly through appropriate slots 35 formed in the bottom portion of the enlarged tube portion 12, are joined, and then at a generally right angle thereto, the hand grip portion of the hand lever extends rearwardly from said juncture.

The torch butt having the high pressure fluid control valve of this invention, generally designated 40, is mounted on the back end of the handle tube, said butt including a main body portion 41 having a reduced diameter portion 42 that extends inwardly into the handle tube. The back end of the handle tube abuts against the shoulder formed by turning down the reduced diameter portion from the main body portion.

Formed integral with the main body portion are the oxygen and the fuel gas bifurcated valve portions 43, 44. A horizontally extending threaded oxygen inlet aperture 47 is formed in the oxygen bifurcated portion 43 to have an adaptor 45 threaded therein. The adaptor 45 is adapted to be fluidly connected through an oxygen line (not shown) to a high pressure source of oxygen (not shown). Similarly a horizontally extending threaded fuel gas inlet aperture 48 is formed in the fuel gas bifurcated portion 44 to have an adaptor (not shown) threaded therein. The fuel gas adaptor is adapted to be connected through a fuel gas line (not shown) to a supply of suitable fuel gas such as acetylene (not shown).

The bifurcated butt portions 43, 44 are constructed to form in part the oxygen needle valve body 51 and the fuel gas needle valve body 52 respectively, the oxygen bifurcated portion being formed to provide an externally threaded nipple 49 to have a needle valve stem subassembly 57 threaded thereon, and the fuel gas bifurcated portion being formed to provide an externally threaded nipple 50 to have a needle valve stem sub-assembly 58 threaded thereon. An oxygen channel 55 fluidly connects the oxygen inlet aperture with the bottom portion of the oxygen chamber 53 in the needle valve body 51. Similarly, a fuel gas channel 56 fluidly connects the fuel inlet aperture with the lower portion of the fuel chamber 54 in the needle valve body 52.

Three spaced, parallel, horizontally extending ports 60, 61 and 62 are formed in the reduced diameter portion of the control valve to extend inwardly into the main body portion, said ports being in the same spaced relation as the apertures formed in the front plate and the bores in the torch head.

The ports 60, 61, and 62 are the torch butt cutting oxygen outlet port, the torch butt preheat oxygen outlet port, and the torch butt fuel outlet port respectively. Each of the ports 60, 61, and 62 has a front enlarged diametric portion to have the back end of one of the conduits 14, 15, and 16, respectively, mounted therein. Adjacent to the preheat oxygen port, but transversely spaced therefrom is a horizontally extending push rod port 63. The forward end of port 63 is threaded to have the back end of the horizontally extending push rod tube 69 mounted therein while the rear end opens through port 64 into the valve bore, generally designated 75, to form the valve outlet port.

Formed in the torch butt is an oxygen passageway 67b that at one end opens into the preheat oxygen port 61 and at the other end to the passageway 67a to be in fluid communication with the internal threaded portion of the needle valve oxygen chamber 53. As may be noted in FIGURE 9, the oxygen needle valve sub-assembly includes a ball 70 that is seatable on a shoulder formed in the oxygen chamber 53 intermediate the oxygen channel and oxygen passageway openings to the oxygen chamber 53, said oxygen needle valve sub-assembly providing means for adjustably controlling the rate of flow of preheat oxygen. Similarly the fuel gas needle valve sub-assembly 58 includes a ball 70 that is seatable on a shoulder formed in fuel gas chamber 54 intermediate the fuel gas channel and fuel gas passageway openings 56, 66a to the fuel gas chamber 54, the fuel gas passageway 66b opening at one end into the back end of the fuel port 62 and at the other end into passageway 66a which in turn opens into the fuel gas chamber through the threaded portion thereof (see FIGURE 11). The fuel gas needle valve sub-assembly provides means for regulating the rate of flow of fuel gas through the torch.

The cutting oxygen valve bore 75 of the control valve 85 of this invention is formed to have a longitudinal axis that is coextensive with the axis of the push rod port 63 and to extend from the push rod port rearwardly to open at the back end of the torch butt. The valve bore 75 consists of an internally threaded portion 76 at the back end thereof, a back cylindrical portion 77 that at one end opens into the threaded portion, a frusto-conical portion 78 that at one end opens into the opposite end of the back cylindrical portion and a front cylindrical portion 79 that at one end opens into the opposite end of the frusto-conical portion and at the opposite end opens into the back end of the push rod port. The front cylindrical portion is of a larger diameter than the diameter of the adjacent portion of the push rod port. An annular rib 81 having an axis coextensive with the push rod port is provided adjacent the juncture of the push rod port with the aforementioned front cylindrical portion.

A back cap 80 is threaded into portion 76 of the valve bore, there being provided an O-ring 86 between the head of the back cap and the adjacent portion of the control valve (see FIGURE 1). A horizontally extending cylindrical recess 87 is provided in the front end of the back cap to seat one end of the coil spring 89, the opposite end of the coil spring bearing against the enlarged diametric portion 92 of the seat retainer 91 and extended over the reduced diameter end portion 90 of said seat retainer. The coil spring constantly urges the seat retainer in a forward direction, the seat retainer being slidably retained in the valve bore.

On the opposite side of the enlarged diametric portion from the reduced diametric end portion and integral with said enlarged diametric portion is an intermediate diametric portion 93. Formed integral with the forward end of the intermediate diameter portion is an enlarged diameter annular flange 94. A cylindrical recess 95 is provided in the intermediate portion to have the generally cylindrical seat pin 97 mounted therein. The forward end of the seat pin is formed to have an enlarged diametric flange 98 having a maximum diameter that is less than the inner diameter of the annular flange 94 and is located axially outwardly of the seat retainer when the seat pin is mounted in recess 95. The annular flange 94 in conjunction with the seat pin flange 98 provides structure for mounting the annular valve seat 100. As may be noted in FIGURE 6, the dimensions of the annular flange 94, the seat pin flange and the valve seat are chosen so that the annular rib 81 abuts against the valve seat without contacting either the seat pin or the seat retainer when said seat retainer is in a forward position, as illustrated in FIGURE 1. The coil spring constantly urges the seat retainer in a forward direction so that the valve seat will bear against the annular rib to form a fluid seal in the valve bore.

A cylindrical opening 101 is formed in the forward end of the seat pin to have a reduced diameter extension 102 of the push rod 103 mounted therein. The push rod extends axially into the push rod tube a distance greater than the rearward movement of the seat retainer in the valve bore when the back cap is threaded in said bore. The main body of the push rod has an annular groove 104 to have the O-ring 105 mounted therein, said O-ring forming a fluid seal to prevent fluid from escaping through the push rod tube. A push rod stem 107 is slidably retained in the push rod tube to have one end bear against the main body of the push rod and the opposite end bear against an arm of the hand lever. The hand lever is mounted for sufficient rotational movement to move the push rod stem and thereby the push rod and seat retainer in a rearward direction (arrow 116) to move the enlarged diameter and flanged portions thereof an amount to provide an annular clearance in the valve bore around said portions to permit an increase of gas flow from zero to full flow, the area of the annular clearance in a rearward position in conjunction with the portion of the opening 110 forwardly of the annular flange being greater than the cross-sectional area of the cutting oxygen port rearwardly of the conduit 14 and also greater than the area of the passage 108.

The oxygen channel 55 extends forwardly to open into the valve bore just rearwardly of the frusto-conical portion at 110, the channel extending at an angle to the axis of the valve bore as shown in FIGURES 4 and 5. The opening 110 is located intermediate the enlarged diametric portion and the annular flange of the seat retainer when said seat retainer is in the forward position as illustrated in FIGURE 1 while the forward edge of the opening is very closely adjacent the back edge of the frusto-conical portion. The passage 108 is formed in the torch butt to open into the cutting oxygen port 60 at one end and at the opposite end open into the push rod port intermediate the rib 81 and the adjacent end of the push rod tube.

In order to more clearly illustrate the structure of the valve, various dimensions of one embodiment will be set forth hereinafter as being exemplary of the invention rather than as a limitation on the invention. The front cylindrical portion 79 of the valve bore has an axial length L of .156 inch and a diameter D of .500 inch. The diameter N of the push rod port adjacent the rib 81 is .386 inch. The portion of the frusto-conical portion 78 adjacent the front cylindrical portion has an included angle A of 4° and at the opposite axial end terminates in a radius R of .037 inch. The diameter D of the rear cylindrical portion (also referred to as the main body portion) 77 is .578 inch. The axial length P of the portion having a radius R is .031 inch, while the axial length X of the included angle portion A is .025 inch. The outer diameter Y of the annular flange of the seat retainer is .498 inch, while the diameter W of the enlarged portion 92 is .562.

In the structure as illustrated and for the dimensions given (with predetermined established tolerances for economical manufacture), the area of annular clearance with the seat retainer moving rearwardly through portion L of the valve bore provides an effective area of opening that covers a variation of .67% to 2.68% of the area of the push rod port (valve outlet port) at N. During the part of valve travel in which the seat retainer moves through the tapered and rounded part X, P of the valve bore, the area of annular clearance increase varies from the above limits to that of the area of the push rod port at M.

It is to be understood that it is possible to establish dimension tolerances that would increase the above variation limits from 0.5% to 10% of the area of the port 63 at N. Even though by decreasing the annular clearance between the valve bore and the outside diameter of the annular flange of the seat retainer and increasing the length of travel of the seat retainer through dimensions L, X, and P, improved results are obtained and would provide the last mentioned variation limits, due to limitations imposed by economical production of the torch butt, dimensions set forth in the above example have been used.

The structure of the torch of this invention having been set forth, the operation thereof will now be briefly described. Initially upon "opening" the oxygen needle valve, a fluid flow path is provided from the oxygen adaptor into the oxygen inlet aperture 47, then to the oxygen channel 55, next into the lower portion of the oxygen chamber 53, thence around the ball 70 of the needle valve and through passageways 67a, 67b into the preheat oxygen port 61. From the preheat oxygen port, the oxygen flows through the preheat oxygen conduit 15 and passage 20 into the torch tip 22. Similarly, when the fuel needle valve is opened, a fluid flow path is provided through the fuel adaptor into the fuel inlet aperture 48, then through the fuel channel 56 into the inner portion of the fuel chamber 54, and thence through passages 66a, 66b to the fuel port 62. From the fuel port 62, the fuel passes through the fuel conduit 16, and passage 21 into the torch tip. The aforementioned oxygen and fuel needle valves may be manipulated whereby the most efficient economical fuel mixture may be obtained for heating prior to beginning the cutting operation.

After the metal being cut has been sufficiently heated, the hand lever 34 is gripped and rotated about pin 32 in the direction of arrow 115 whereby the push rod stem 107, the push rod 103, and the seat retainer 91 are forced to move in the same direction against the resistance of the coil spring 89. The seat retainer in being moved rearwardly moves the valve seat away from the rib to open the cutting oxygen fluid flow path through the torch, there being a narrow annular clearance between the annular flange and the front cylindrical portion of the valve bore. The cutting oxygen fluid flow path extends from the oxygen inlet aperture 47 through passage 55 and into the rear cylindrical portion 77 of the valve bore. Oxygen in the valve bore passes through the annular space between the valve bore and the seat retainer, next into the reduced end portion of the push rod port 63, and thence through opening 108 into the cutting oxygen port 60. From the cutting oxygen port cutting oxygen passes forwardly through the cutting oxygen conduit 14 and passage 19 into the torch tip. When the hand lever is released, the coil spring forces the seat retainer to move forwardly so that the valve seat 100 in combination with the annular rib forms a fluid seal to thereby prevent passage of cutting oxygen into the cutting oxygen conduit. The seat retainer in moving forwardly will also cause the push rod to move in the same direction to thereby move the hand lever 34 to the position illustrated in FIGURE 1. The enlarged diametric portion 92 serves to maintain the proper alignment of the enlarged diameter annular flange 94 relative to the frustoconical portion 78 and front cylinder portion 79 of the valve bore 75 as the seat retainer 91 is moved between the positions described heretofore.

As above mentioned and as apparent from the illustrative example of dimensions, there is an annular clearance between the valve bore and the seat retainer. As the forward annular edge of the seat retainer is moved rearwardly through the frusto-conical portion 78 of the valve bore, the effective annular clearance increases. By providing the valve seat retainer and contouring the valve bore as described heretofore, the increasing annular clearance results in a relatively constant increase in gas flow from zero to full flow.

The aforementioned valve action yields a relatively low gas flow for starting the cut, followed without interruption by a flow in the volume required for the metal being cut. This is in contrast to conventional cutting oxygen control valves wherein the flow of cutting increases abruptly from a low flow to fuel gas flow.

As previously mentioned, with conventional high pressure oxygen valves, it is difficult to exercise sufficient control of the high pressure oxygen flow rate since the valves are usually closed or wide open. However, using the control valve of this invention, the flow of cutting oxygen increases relatively gradually from zero to the required full flow and thus in a piercing operation, the chemical reaction between the hot steel and the oxygen jet can be controlled so that flying slag is greatly reduced while the pierce is being started. Once the pierce has penerated part way into the metal, the valve can be fully opened to complete the pierce. Also using the control valve of this invention the tendency to "kick back" at the start of the piercing or cutting operation is greatly reduced because of providing a gradual increase of gas flow and consequently it is much easier to start the cut. The "kick back" phenomenon is particularly noticeable (and objectionable) with conventional torches when piercing thick material when a high gas flow rate is required. Unless the operator reacts quickly, the kick-back can have an adverse effect upon the start of the cut. Additionally, the control valve of this invention contributes greatly to the manual control of the torch in a cutting operation, which starts at the edge of a plate and is particularly advantageous when cutting heavy steel (i.e. thick steel).

As many widely apparently different embodiments of this invention may be made without departing from the spirit and scope thereof, it is to be understood that I do not limit myself to the specific embodiments herein.

What I claim is:

1. A torch having a torch head, a torch tip mounted in said torch head, said torch head having at least two fluid passages formed therein to open into the torch tip, a torch butt having at least two fluid channels formed therein, a fluid conduit for each fluid channel interconnecting a fluid channel with a fluid passage, one of said channels being an oxygen channel, said oxygen channel including an inlet passage, a valve bore having an elongated axis that through a substantial portion of its length its generally circular in transverse cross section, a fourth passage placing the inlet passage in fluid communication with the valve bore, and a fifth passage placing the valve bore in fluid communication with a conduit, said valve bore and fifth passages being of a size and shape to cooperatively form a valve seat where the fifth passage opens to the valve bore, said fourth and fifth passages being in axial spaced relation with at least a substantial part of the aforementioned portion intermediate said fourth and fifth passages, said bore having a second portion intermediate said fourth and fifth passages axially tapered to converge in a direction of the flow of the oxygen through the valve bore, means cooperating with the valve bore for controlling the gas flow rate through the valve bore to constantly increase relatively gradually from approximately zero to full flow, and hand operate means for operating the control means to provide the aforementioned fluid flow through the oxygen channel, said control means including a control valve slidably mounted in said valve bore, said valve including a cylindrical portion having means to cooperate with the valve seat for blocking the flow of oxygen from the valve bore through said fourth passage and located to be moved through the tapered portion in a direction of increasing cross sectional area of the tapered portion to permit an increase of flow rate of gas through the oxygen channel, said valve bore having a cylindrical portion intermediate the tapered portion and said valve seat, said valve cylindrical portion being located in the valve bore cylindrical portion when a flow of oxygen through the valve bore is blocked and said cylindrical portions being spaced apart to form a small annular clearance between said cylindrical portions.

2. A cutting torch comprising a torch head having a torch tip, a fuel gas passage, a pre-heat oxygen passage, and a cutting oxygen passage, said passages being in fluid communication with the torch tip, a torch butt having a preheat oxygen fluid channel including a outlet passage, a cutting oxygen fluid channel including an outlet passage formed in the torch butt and a conduit placing the aforementioned outlet passage in fluid communication with the cutting oxygen passage, and a fuel gas fluid channel including an outlet passage formed in the torch butt and a conduit placing the last mentioned outlet port in fluid communication with the fuel gas passage, said preheat oxygen fluid channel and fuel gas fluid channel each including an inlet passage, means located intermediate the fuel gas inlet passage and fuel gas outlet passage for regulating the rate of flow of gas through the fuel gas fluid channel, means located intermediate the preheat oxygen inlet passage and the preheat oxygen outlet passage for regulating the flow of preheat oxygen through the preheat oxygen fluid channel, said cutting oxygen fluid channel opening into the preheat oxygen channel intermediate the preheat oxygen inlet passage and the preheat oxygen regulating means and including a valve bore intermediate the last mentioned opening and cutting oxygen outlet passage, said valve bore having a tapered portion converging toward the cutting oxygen outlet passage, a valve seat adjacent the portion of the valve bore closest to the cutting oxygen outlet passage, a valve slidably mounted in said valve bore, said valve having a front portion constructed to cooperate with the valve seat to prevent the flow of fluid from the tapered portion to the cutting oxygen outlet passage, said front portion in cross section along the length thereof having an outer perimetric surface of a constant shape and size, and means for moving said front portion through the narrow end of the tapered portion of the valve bore toward the wider end to permit the rate of flow of cutting oxygen through the cutting oxygen fluid channel to graduually increase as said front portion is moved through the tapered portion, said valve bore having a threaded end and a back cap threaded in the bore and resilient means mounted in the bore to bear against the back cap and the valve to constantly urge the valve to a close position to prevent flow of oxygen through the cutting oxygen fluid channel, said valve bore having a cylindrical portion intermediate the tapered portion and the cutting oxygen outlet passage that is of a slightly larger diameter than said front portion, said front portion in a closed position being located in the valve bore cylindrical portion.

3. In a torch for heating and cutting metal and having a torch tip, a torch head mounted on said tip and having a plurality of fluid passages in fluid communication with the torch tip, a conduit for each fluid passage connected at one end in fluid communication with a fluid passage, a torch butt having an oxygen outlet passage, a fluid gas outlet passage and a cutting oxygen outlet passage, each outlet passage being in fluid communication with a conduit, a fuel gas inlet passage, a fuel gas channel placing the fuel gas inlet passage in fluid communication with the fuel gas outlet passage, an oxygen inlet passage and a fluid channel placing the oxygen inlet passage in fluid communication with said oxygen outlet passage, and a hand lever movably connected to the torch butt, the improvement being an elongated valve bore in the torch butt that is for a substantial portion generally circular in cross section and contoured from front to the rear thereof to provide a front cylindrical portion, an adjacent frusto-conical portion having an apex end opening into the front cylindrical portion, and a main body portion having a diameter at least the same size as the diameter of the base of the frusto-conical portion and opening into the base end of the frusto-conical portion, said main body portion opening to the oxygen inlet passage, and a cutting valve passage at the front end of the front cylindrical portion placing the front cylindrical portion in fluid communication with the cutting oxygen outlet passage, said front cylindrical portion being of a substantially larger diameter than the cutting valve passage, and first means for acting in cooperating with the valve bore to alternately block the flow of oxygen through the valve bore and providing a valve action that gives the relative low oxygen flow for the start of a cut followed without interruption by a full flow in a volume required for the cutting operation, and second means for operating the aforementioned means in the aforementioned manner upon moving the hand lever, said first mentioned means including a control valve slidably mounted in the valve bore, a push rod passage opening through the cutting oxygen valve passage into the valve bore and extending coaxially relative to the valve bore, said second means including push rod means extending through the push rod passage for moving the rod from a position blocking the cutting oxygen valve passage to a position permitting full flow of oxygen through the cutting oxygen passage upon moving the hand lever, means mounted in the valve bore for resiliently urging the control valve to block the flow of oxygen through the cutting oxygen outlet passage, said control valve having a front cylindrical portion of a slightly smaller diameter than the valve bore cylindrical portion, said cylindrical portions being of substantial axial length relative to the clearance between said cylindrical portions, and said valve bore being of sufficient axial length to permit the front valve portion being moved axially rearwardly of the frusto-conical portion, said control valve including an enlarged diametric portion located axially rearwardly of the front cylindrical valve portion when the control valve is in position to block the flow of oxygen through the cutting oxygen outlet passage, and an angular rib formed adjacent the opening of the cutting oxygen valve passage to the valve bore, said control valve including a valve seat mounted on the front valve portion to cooperate with the annular rib to form a fluid seal, and that the opening from the oxygen inlet passage into the valve bore means is adjacent the enlarged diametric portion.

References Cited in the file of this patent

UNITED STATES PATENTS

| | | |
|---|---|---|
| 1,370,258 | Allen et al. | Mar. 1, 1921 |
| 1,633,265 | Morrison | June 21, 1927 |
| 1,668,107 | Dillon | May 1, 1928 |
| 2,014,314 | Defenbaugh | Sept. 10, 1935 |
| 2,279,367 | Crowley | Apr. 14, 1942 |
| 2,507,102 | Hammon | May 9, 1950 |
| 2,876,789 | Borden | Mar. 10, 1959 |